United States Patent
Taniguchi

(10) Patent No.: US 12,477,509 B2
(45) Date of Patent: Nov. 18, 2025

(54) WIRELESS COMMUNICATION SYSTEM, REPEATER, AND WIRELESS COMMUNICATION METHOD

(71) Applicant: Panasonic Intellectual Property Management Co., Ltd., Osaka (JP)

(72) Inventor: Kosuke Taniguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 329 days.

(21) Appl. No.: 18/224,268

(22) Filed: Jul. 20, 2023

(65) Prior Publication Data

US 2025/0031177 A1 Jan. 23, 2025

(51) Int. Cl.
  *H04W 64/00* (2009.01)
  *H04W 4/38* (2018.01)
(52) U.S. Cl.
  CPC .......... *H04W 64/006* (2013.01); *H04W 4/38* (2018.02)
(58) Field of Classification Search
  CPC ...................................................... H04W 4/38
  See application file for complete search history.

(56) References Cited

U.S. PATENT DOCUMENTS

| | | | |
|---|---|---|---|
| 9,958,277 B1* | 5/2018 | Espy | H04W 4/024 |
| 2010/0297937 A1* | 11/2010 | Kim | H04B 7/1555 |
| | | | 455/11.1 |
| 2022/0116108 A1* | 4/2022 | Matsuo | H04W 72/20 |
| 2024/0039619 A1* | 2/2024 | Sakamoto | H04B 7/155 |

FOREIGN PATENT DOCUMENTS

| | | |
|---|---|---|
| EP | 3 220 599 | 9/2017 |
| EP | 3 182 667 | 12/2019 |
| JP | 2010-157845 | 7/2010 |
| JP | 2019-197565 | 11/2019 |

OTHER PUBLICATIONS

Extended European Search Report issued Jan. 2, 2024 in corresponding European Patent Application No. 23186573.4.

* cited by examiner

*Primary Examiner* — William G Trost, IV
(74) *Attorney, Agent, or Firm* — Wenderoth, Lind & Ponack, L.L.P.

(57) ABSTRACT

A wireless communication system, a repeater, and a wireless communication method capable of transmitting a message to another user in a specific area selected by a user are provided. The wireless communication system includes a plurality of wireless communication terminals and the repeater. The wireless communication terminal acquires an operation of a user, and transmits a message and direction information. The repeater determines a communication area based on the received information, and transmits a message to another wireless communication terminal worn by a user in the communication area.

11 Claims, 11 Drawing Sheets

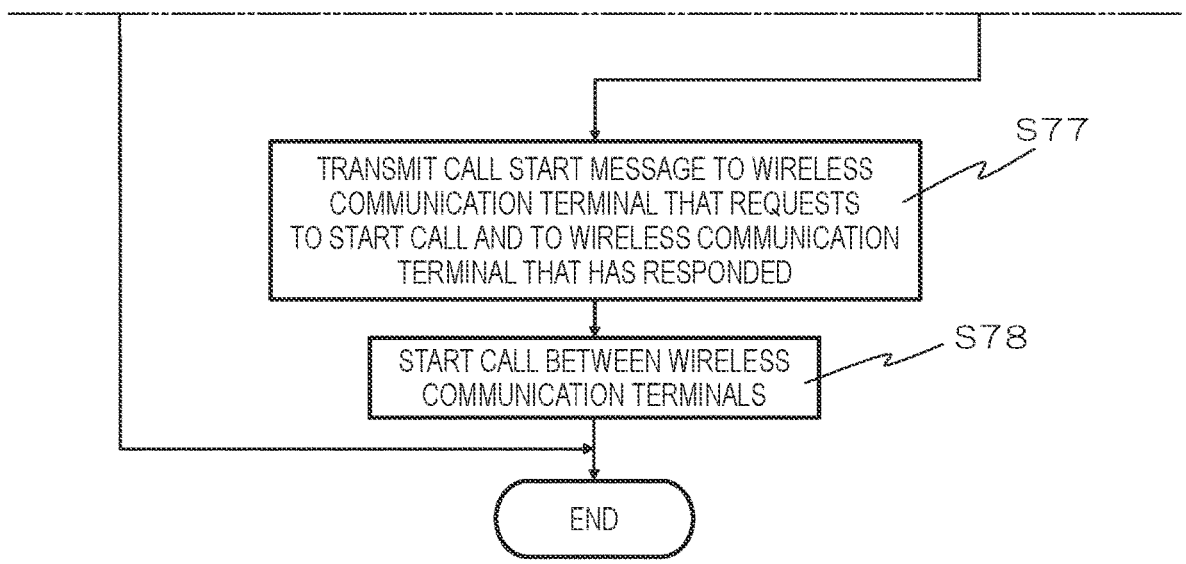

WIRELESS COMMUNICATION SYSTEM, REPEATER, AND WIRELESS COMMUNICATION METHOD

TECHNICAL FIELD

The present disclosure relates to a wireless communication system, a repeater, and a wireless communication method that communicate with other users.

BACKGROUND ART

Patent Literature 1 discloses a method in which a wearable terminal is worn by a user working in a predetermined area such as a factory, a call is made from an administrator to a user, and a call is started safely.

CITATION LIST

Patent Literature

Patent Literature 1: JP2019-197565A

SUMMARY OF INVENTION

The present disclosure provides a wireless communication system and a wireless communication method capable of transmitting a message to another user in a specific area selected by a user.

A wireless communication according to the present disclosure includes a plurality of wireless communication terminals and a repeater. The wireless communication terminals communicate via the repeater in a predetermined area. The wireless communication terminal includes an acquisition unit configured to acquire an operation of a user, a transmission unit configured to transmit a message and direction information based on the operation of the user to the repeater when starting communication with another wireless communication terminal in the predetermined area via the repeater based on the operation of the user, and a message reception unit configured to receive a message from the repeater. The repeater includes a map information storage unit configured to store map information obtained by dividing the predetermined area into a plurality of areas, a position specifying unit configured to acquire position information for specifying a position of the plurality of wireless communication terminals in the predetermined area, and a control unit configured to transmit a message to the other wireless communication terminal in a communication area when the message and the direction information are received from the wireless communication terminal. The control unit is configured to determine, as the communication area, at least one area among the plurality of areas based on the map information, the position information, and the direction information.

A repeater according to the present disclosure communicates with a plurality of wireless communication terminals in a predetermined area. The repeater includes a map information storage unit configured to store map information obtained by dividing the predetermined area into a plurality of areas, a position specifying unit configured to acquire position information for specifying a position of the plurality of wireless communication terminals in the predetermined area, and a control unit configured to transmit a message to another wireless communication terminal that is different from the wireless communication terminal in a communication area when a message and direction information based on an operation of an user are received from the wireless communication terminal. The control unit is configured to determine, as the communication area, at least one area among the plurality of areas based on the map information, the position information, and the direction information.

Further, a wireless communication method in which a plurality of wireless communication terminals communicate via a repeater within a predetermined area according to the present disclosure includes acquiring an operation of a user: transmitting a message and direction information based on an operation of the user to the repeater when starting communication with another wireless communication terminal in the predetermined area via the repeater based on the operation of the user: acquiring position information for specifying a position of the plurality of wireless communication terminals in the predetermined area: determining, based on map information obtained by dividing the predetermined area into a plurality of areas, the position information, and the direction information, at least one area among the plurality of areas as a communication area; and transmitting a message to the other wireless communication terminal in the communication area.

According to the present disclosure, it is possible to transmit a message to another user in a specific area selected by a user.

DESCRIPTION OF EMBODIMENTS

Background of Present Disclosure

In the related art, there is a method of notifying a user working in a predetermined area as disclosed in Patent Literature 1, but there is no method for notification in a specific area in a predetermined area.

On the other hand, in an airplane to be described below, it may be difficult to notify a user who provides a specific service or works. This is because a user in an airplane needs preparation before boarding, for example, every time a different user boards a flight, it is necessary for the user to register on a terminal.

Therefore, an object of the present disclosure is to enable a user who wants to notify to intuitively notify a specific user while eliminating the need for prior registration or the like, by a notification user designating a specific area where a specific user exists, rather than specifying the specific user.

Hereinafter, an embodiment will be described in detail with reference to the drawings as appropriate. Unnecessarily detailed description may be omitted. For example, a detailed description of well-known matters and a redundant description of substantially the same configuration may be omitted. This is to avoid the following description from being unnecessarily redundant and facilitate understanding by those skilled in the art.

The accompanying drawings and the following description are provided for those skilled in the art to fully understand the present disclosure and are not intended to limit the subject matters described in the claims.

First Embodiment

Hereinafter, a first embodiment will be described with reference to FIGS. 1 to 10. A wireless communication system is used for communication between users having wireless communication terminals within a predetermined target area, for example, a mobile body such as an airplane or a train, a building such as a factory or a commercial facility, or a certain range used at an event or the like. Hereinafter, a work area, which is a cabin area in an airplane, will be described as an example of the target area.

1-1. Configuration

<1-1-1. Environment in which Wireless Communication System is Used>

Figure 1:
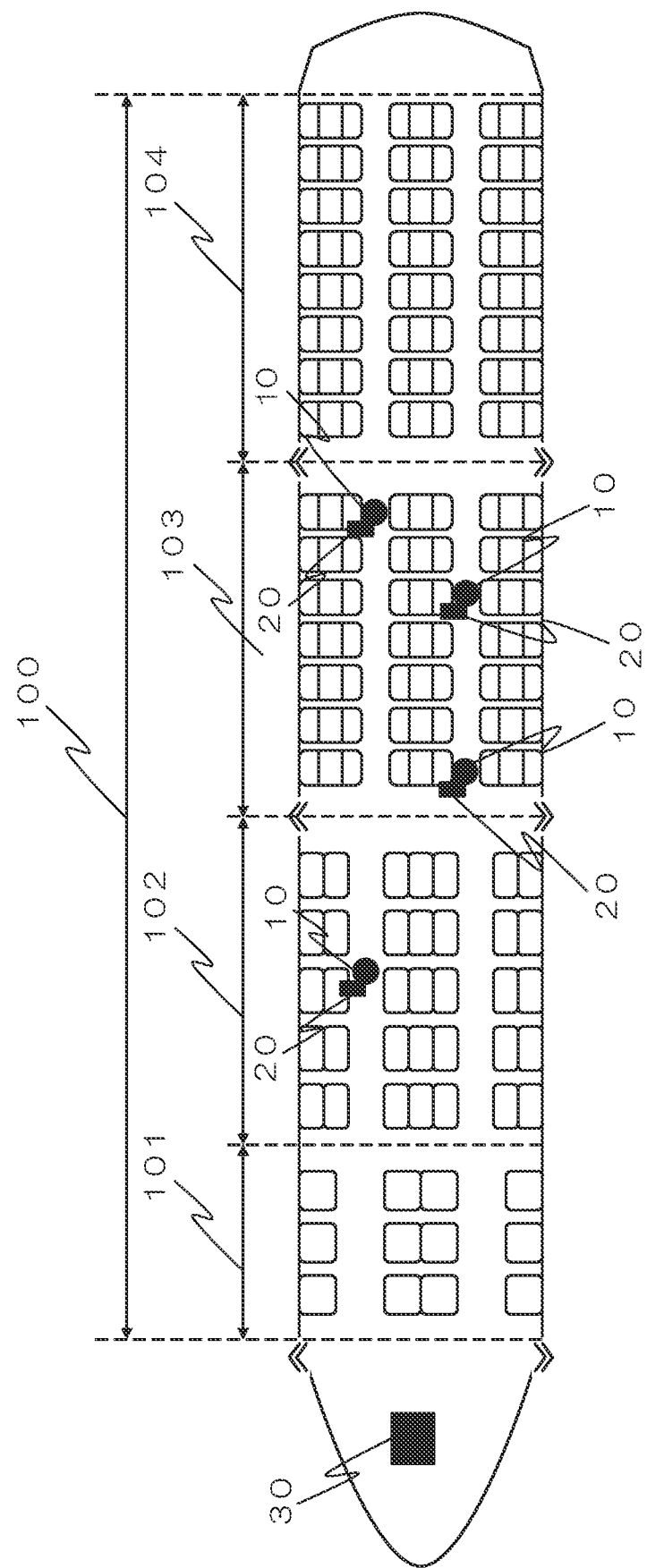
FIG. 1 is a schematic diagram of the interior of an airplane showing an example of an environment in which a wireless communication system according to a first embodiment is used.

FIG. 1 is a schematic diagram of the interior of an airplane showing an example of an environment in which a wireless communication system including a wireless communication terminal and a repeater according to the first embodiment is used.

As shown in FIG. 1, the wireless communication system includes wireless communication terminals 20 and a repeater 30 in a work area 100. The wireless communication terminals 20 are used by users 10 that provide services and work in the work area 100. The wireless communication terminals 20 can be worn and used by the users 10, and include, for example, a wristband type wearable terminal to be worn on an arm of a user. Note that the wireless communication terminals 20 may be a portable terminal such as a glasses-type wearable terminal, a head-mounted type wearable terminal, or a smartphone. Any device may be used as long as it includes a configuration of a wireless communication terminal to be described later. Hereinafter, a case where the wireless communication terminals are wristband type wearable terminals and the users 10 are cabin crew members will be described as an example.

As shown in FIG. 1, in the wireless communication system, one user uses one wireless communication terminal 20. Therefore, the wireless communication system includes the wireless communication terminals 20 as many as the number of the users 10.

The repeater 30 is an electronic device (server or the like) that manages communication between the wireless communication terminals 20 in the work area 100. Note that the repeater 30 may be installed outside a target moving body, a building, or a certain range.

As shown in FIG. 1, the work area 100 is logically divided into a plurality of sub areas. In the example shown in FIG. 1, the work area 100 is divided into a sub area 101, a sub area 102, a sub area 103, and a sub area 104.

Although omitted in FIG. 1, it is assumed that a plurality of access points for the wireless communication terminals 20 to perform wireless communication are provided in the work area 100.

<1-1-2. Network Configuration>

Figure 2:
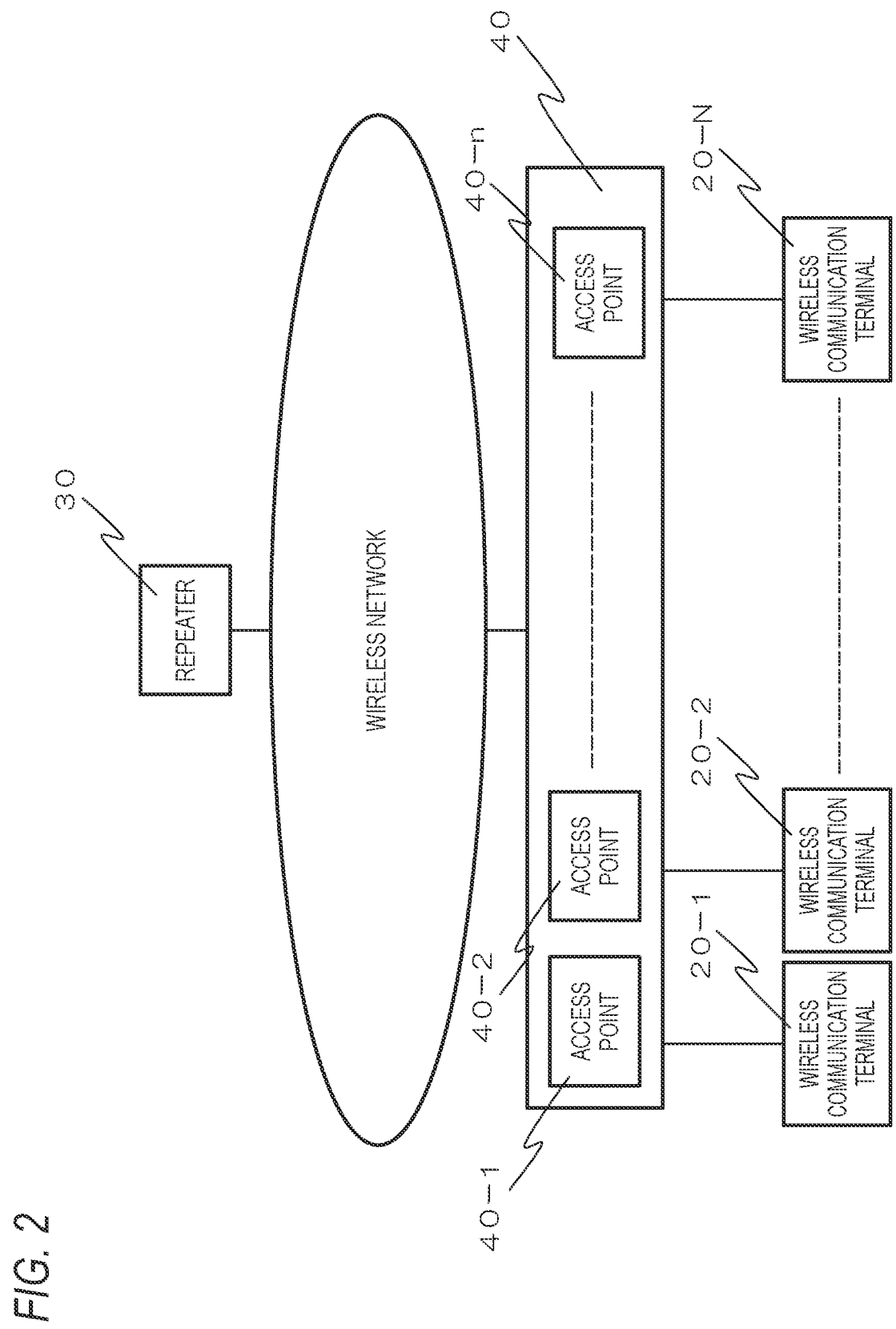
FIG. 2 is a schematic diagram showing a network configuration of the wireless communication system according to the first embodiment.

FIG. 2 is a schematic diagram showing a network configuration of the wireless communication system according to the first embodiment. The wireless communication terminal 20 is connected to wireless network via an access point 40 using Bluetooth (registered trademark), WiFi (registered trademark), or the like, and can communicate with the repeater 30. In FIG. 2, a plurality of wireless communication terminals 20 include wireless communication terminals 20-1, 20-2, . . . , and 20-N (N being an integer of three or more, for example). In FIG. 2, a plurality of access points 40 include access points 40-1, 40-2, . . . , 40-$n$ (n being an integer of three or more, for example).

<1-1-3. Configuration of Wireless Communication Terminal 20>

Figure 3:
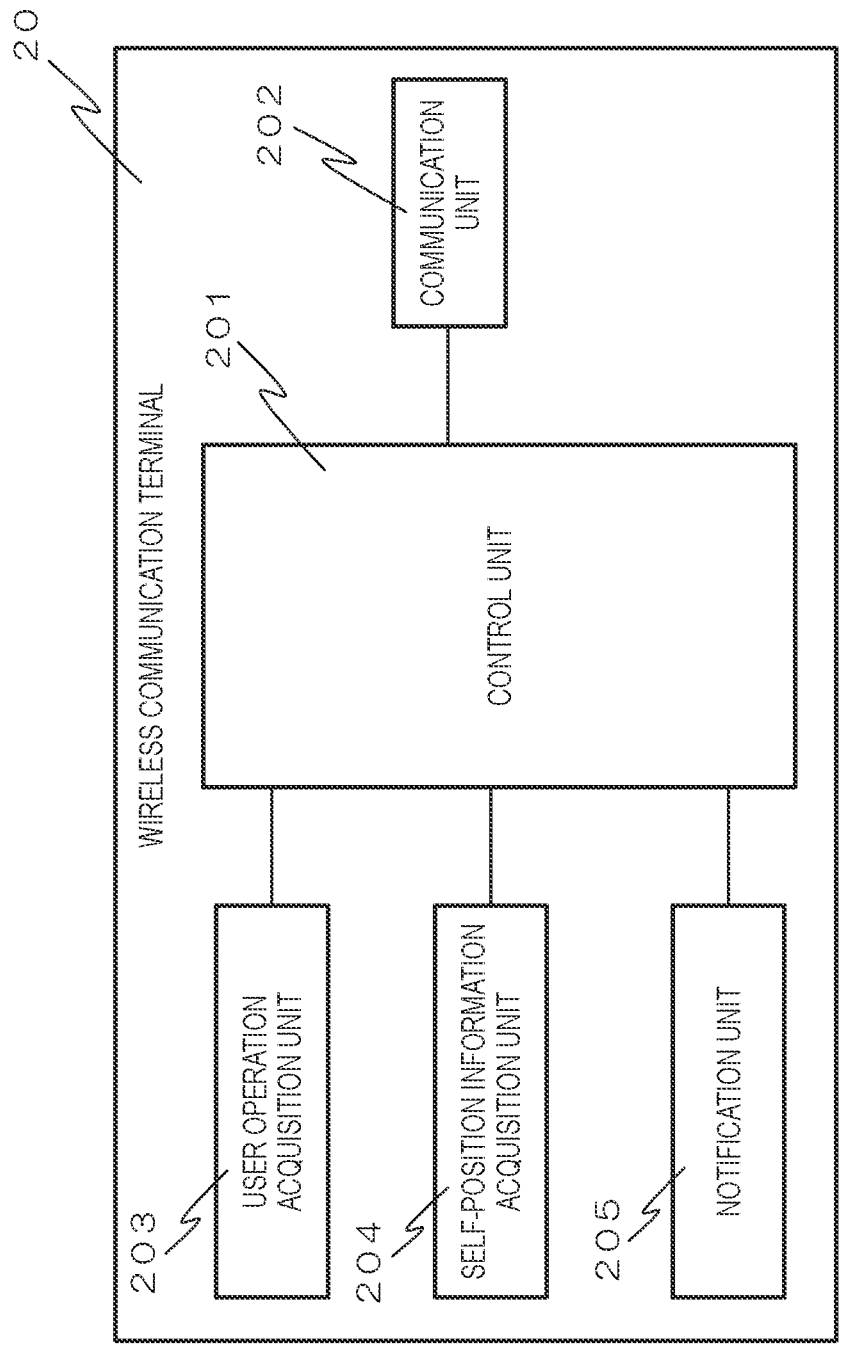
FIG. 3 is a configuration diagram of a wireless communication terminal according to the first embodiment.

FIG. 3 is an example of a configuration diagram of the wireless communication terminal 20. As shown in FIG. 3, the wireless communication terminal 20 includes a control unit 201, a communication unit 202, a user operation acquisition unit 203, a self-position information acquisition unit 204, and a notification unit 205.

The communication unit 202 has a function of communicating with the repeater 30 via the access point 40.

The user operation acquisition unit 203 has a function of acquiring, from the user, an operation of message transmission, direction information on a counterpart who transmits a message, and the like. Here, the message is a message requesting to start a call or a text message. For example, the user operation acquisition unit 203 may be implemented by a touch panel when an operation is acquired from a touch operation of the user, or may be implemented by a combination of an acceleration sensor and an angular velocity sensor when an operation is acquired from a specific gesture. Details of an operation to be acquired from the user will be described later.

The self-position information acquisition unit 204 has a function of acquiring position information on the user 10 in the work area 100. The position information (hereinafter, referred to as "self-position information") acquired by the self-position information acquisition unit 204 may be any information that allows the repeater 30 to specify the position of the user 10 in the work area 100, and is information calculated based on signal intensity from the access point. Note that the position information may be information acquired by communication with a GPS satellite by using a GPS sensor.

The notification unit 205 has a function of notifying the user, for example, when a message is received from the repeater 30. The notification unit 205 may be achieved by a method of providing a visual notification with a display such as an LCD, may be achieved by a method of providing a tactile notification with a vibration device, or may be achieved by a method of providing an audible notification with a speaker. In addition, the notification unit 205 may be achieved by a combination of these methods.

The control unit 201 has a function of controlling the communication unit 202, the user operation acquisition unit 203, the self-position information acquisition unit 204, and the notification unit 205 to deliver information between the components.

Although not shown in FIG. 3, it is assumed that the wireless communication terminal 20 further includes a microphone or the like, and has a voice call function achieved by, for example, a VoIP (Voice over Internet Protocol) technology or the like. With the voice call function, the user 10 can perform voice communication with another user 10 by using the wireless communication terminal 20.

<1-1-4. Configuration of Repeater 30>

Figure 4:
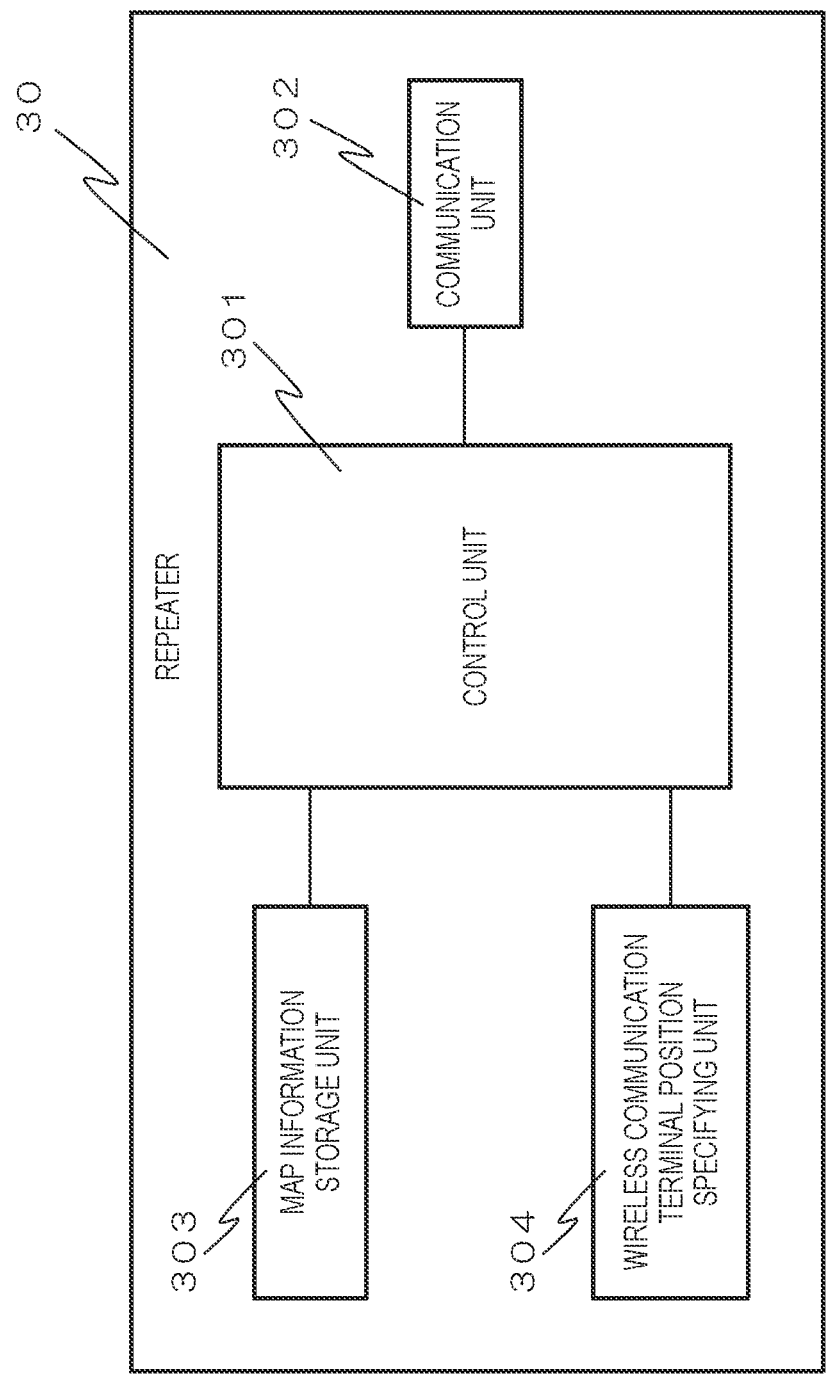
FIG. 4 is a configuration diagram of a repeater according to the first embodiment.

FIG. 4 is an example of a configuration diagram of the repeater 30. As shown in FIG. 4, the repeater 30 includes a control unit 301, a communication unit 302, a map information storage unit 303, and a wireless communication terminal position specifying unit 304.

The communication unit 302 has a function of communicating with the wireless communication terminal 20 via the access point 40.

The map information storage unit 303 has a function of storing distance information of the work area 100 prepared in advance, position information of the access point, and information on each divided sub areas (hereinafter, these pieces of information are collectively referred to as map information). When position estimation of the wireless communication terminal is performed based on the signal strength from the access point, since a physical distance information of the work area 100 and the position information of the access point are required, these pieces of information are stored in the map information storage unit 303.

The wireless communication terminal position specifying unit 304 has a function of specifying the position of the wireless communication terminal 20 in the work area 100 by combining the map information stored in the map information storage unit 303 and the self-position information received from the wireless communication terminal 20 and storing the information.

The control unit 301 has a function of controlling the communication unit 302, the map information storage unit 303, and the wireless communication terminal position specifying unit 304 to deliver information between the components. Although details will be described later, when the repeater 30 receives a message such as a call start request from the wireless communication terminal 20, the repeater 30 has a function of determining an area for transmitting a message (hereinafter, referred to as a communication area) from the repeater 30.

1-2. Operation

Operations of the wireless communication system configured as described above will be described below.

<1-2-1. Overall Operation of Wireless Communication System>

Figure 5:
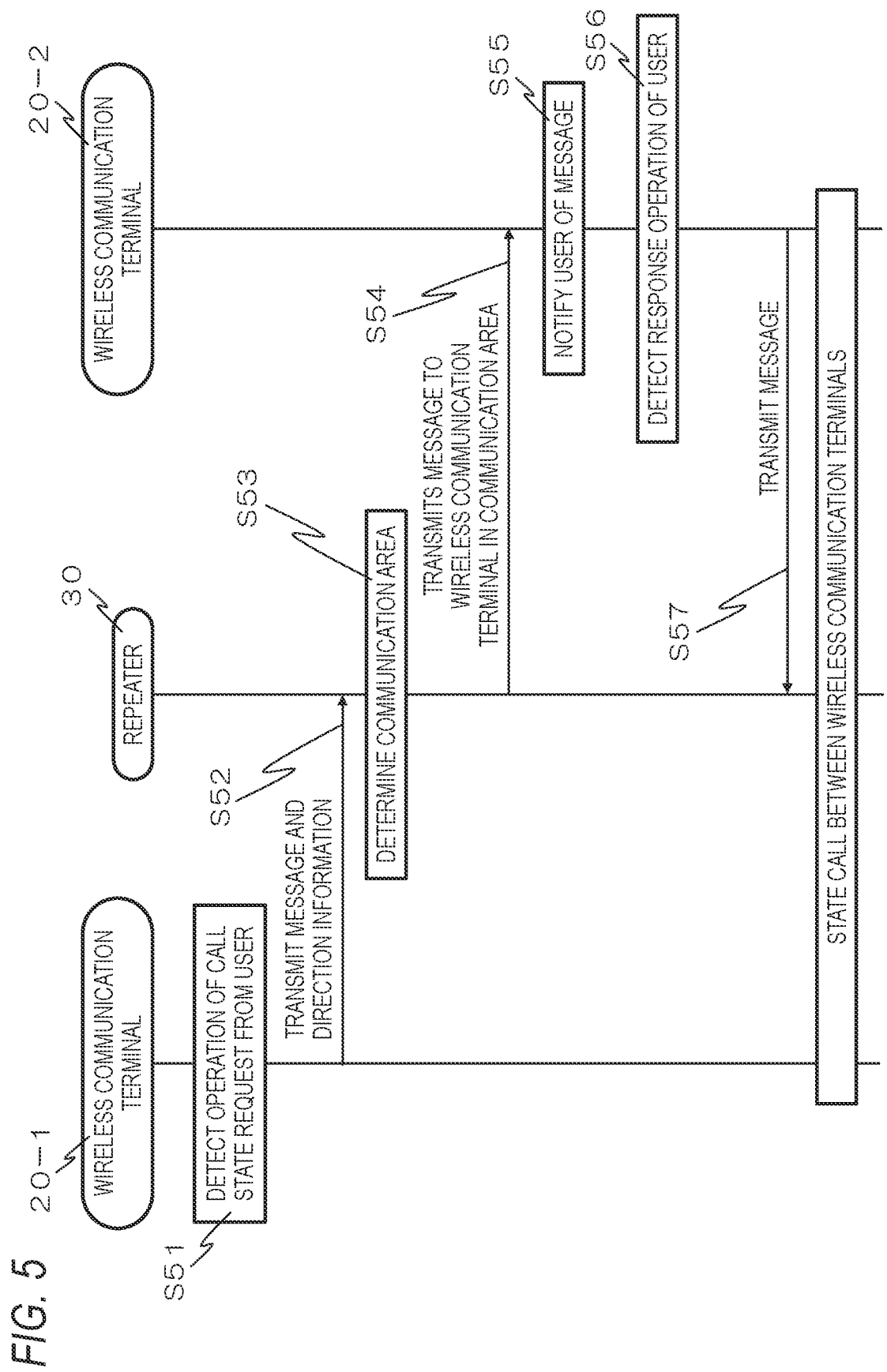
FIG. 5 is a sequence diagram illustrating an overall operation of the wireless communication system according to the first embodiment.

FIG. 5 is a sequence diagram illustrating the overall operation of the wireless communication system by taking, as an example, a case where the wireless communication terminal 20-1 transmits a message requesting to start a call with another wireless communication terminal and the wireless communication terminal 20-2 responds.

It is assumed that each wireless communication terminal 20 periodically transmits the self-position information to the repeater 30, and the repeater 30 always grasps the position of each wireless communication terminal 20 in the work area 100.

First, a user 10-1 who wants to start a call performs an operation of requesting to start a call. At this time, information on a direction in which the call is to be made (hereinafter, referred to as direction information) is input. The direction information is, for example, information designating a direction in the work area 100, such as a front direction, a rear direction, and a left wing direction of the airplane, and may be further divided more finely than four directions. The direction information is acquired by the user operation acquisition unit 203 of the wireless communication terminal 20. A method for acquiring the user operation may be, for example, acquiring by touching a touch panel by the user, or may be acquiring by detecting a specific gesture such as hand raising or shaking of the arm using a sensor. When the operation of hand raising is used, the direction can be designated by a direction of the raised hand.

When the wireless communication terminal 20-1 worn by the user 10-1 detects an operation of a call start request (S51), the wireless communication terminal 20-1 transmits a message requesting to start a call and the direction information to the repeater 30 (S52).

When receiving the message requesting to start the call, the repeater device 30 determines a communication area for transmitting the message requesting to start the call based on the map information and the self-position information of each wireless communication terminal stored in the repeater 30, and the direction information transmitted from the wireless communication terminal 20-1 (S53), and transmits the message to the wireless communication terminal 20 in the communication area (S54). At this time, the message may be transmitted to all wireless communication terminals 20 in the communication area, or may be transmitted to only the wireless communication terminal 20 that is moving in the communication area. Details of a communication area determination method will be described later.

Here, each wireless communication terminal 20 periodically transmits the self-position information to the repeater 30, so that the wireless communication terminal 20 having a change in the self-position information can be determined the wireless communication terminal that is moving. Note that when being used in a cabin of an airplane or the like, the wireless communication terminal 20 of the user 10 during customer service may be excluded from receiving a message, and in such a case, since the user 10 during customer service does not move, it is effective to transmit only to the wireless communication terminal 20 that is moving as described above.

As described above, the message is transmitted to each wireless communication terminal 20 in the communication area, and thereafter, a wireless communication terminal 20-2 in the communication area will be described as an example. When the wireless communication terminal 20-2 in the communication area receives a message of a call start response request, the wireless communication terminal 20-2 notifies a user 10-2 wearing the wireless communication terminal 20-2 of the message (S55). Specifically, notification is made by a calling sound or vibration. When the user 10-2 performs an operation to respond to the call start response request and the wireless communication terminal 20-2 detects the operation (S56), the wireless communication terminal 20-2 transmits a message indicating that the call can be started to the repeater 30 (S57).

When the repeater 30 receives the message from the wireless communication terminal 20-2, the call is started between the wireless communication terminal 20-1 and the wireless communication terminal 20-2 via the repeater 30.

Note that transmission of a message requesting to start the call is described as an example. Alternatively, a text message or the like may be transmitted, and in this case, a response may not be necessary after the wireless communication terminal 20 in the communication area receives the message.

<1-2-2. Detailed Operation in Wireless Communication Terminal 20 and Repeater 30>

Hereinafter, the processes of the wireless communication terminal 20-1, the repeater 30, and the wireless communication terminal 20-2 will be described with reference to FIGS. 6 to 8, respectively, by taking, as an example, a case where the wireless communication terminal 20-1 (worn by the user 10-1) transmits a message requesting to start a call with another wireless communication terminal, and the wireless communication terminal 20-2 (worn by the user 10-2) responds.

Figure 6:
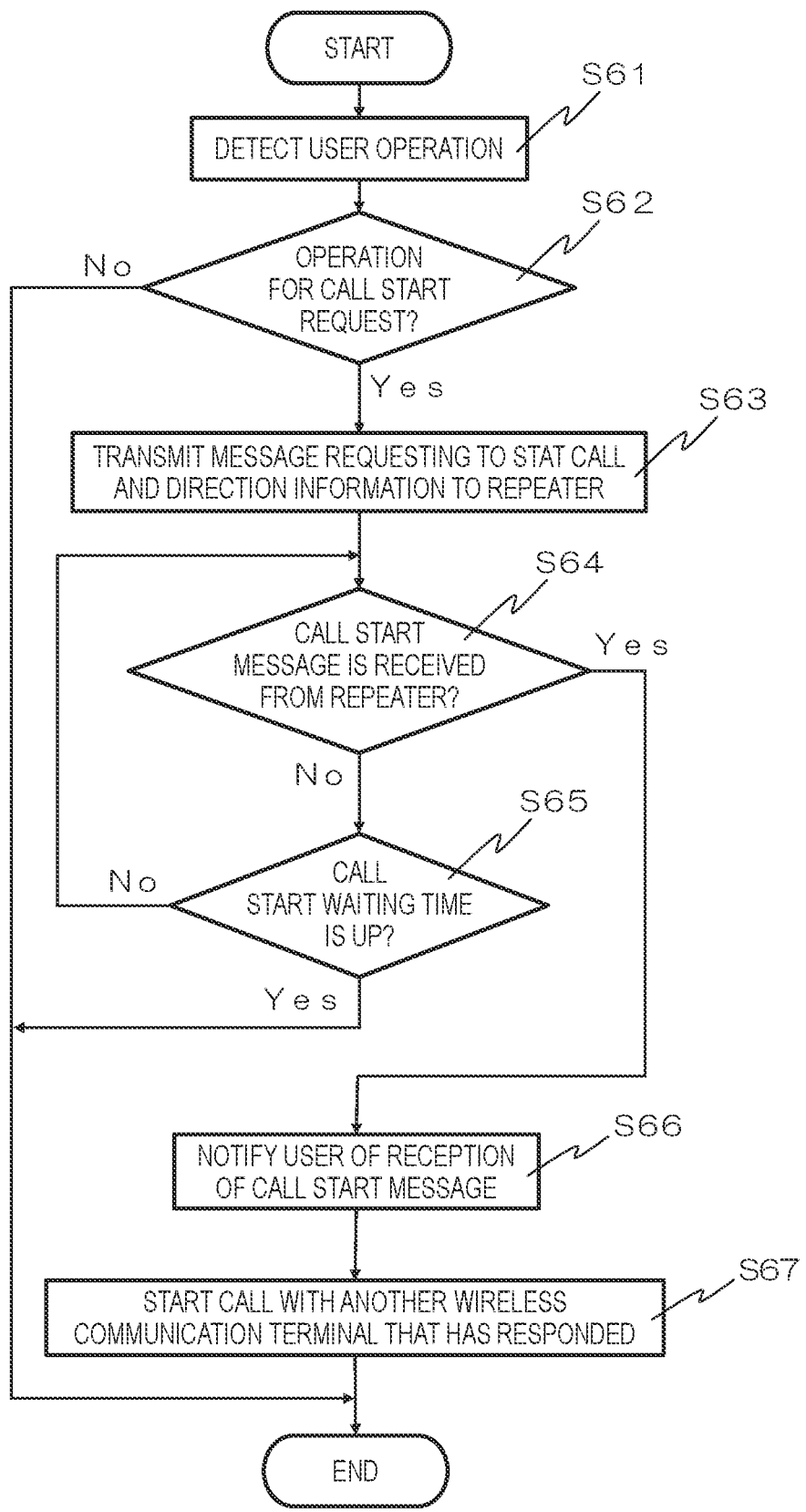
FIG. 6 is a flowchart showing a process of the wireless communication terminal when making a call start request according to the first embodiment.

FIG. 6 is a flowchart illustrating the process of the wireless communication terminal 20-1 when transmitting a message requesting to start a call by the user 10-1.

First, when an operation of the user 10-1 is detected (S61), it is determined whether the operation is an operation for a call start request (S62).

When it is determined that the user operation is for the call start request (YES in S62), a message requesting to stat a call and direction information are transmitted to the repeater 30 (S63). The direction information is acquired at the time of the user operation detection (S61).

After transmitting the message requesting to stat a call and the direction information, the wireless communication terminal 20-1 waits for a certain period of time to receive a call start message from the repeater 30 (S64, S65). As will be described later in detail, during this time, the repeater 30 waits for a response after transmitting a message of a call start response request to a wireless communication terminal in the communication area, and when there is a response, the repeater 30 transmits the call start message to the wireless communication terminal 20-1.

When receiving the call start message from the repeater 30 (YES in S64), the wireless communication terminal 20-1 notifies the user 10-1 of the reception of the call start message (S66), and starts a call with the wireless communication terminal 20-2 that has responded (S67).

Figure 7:
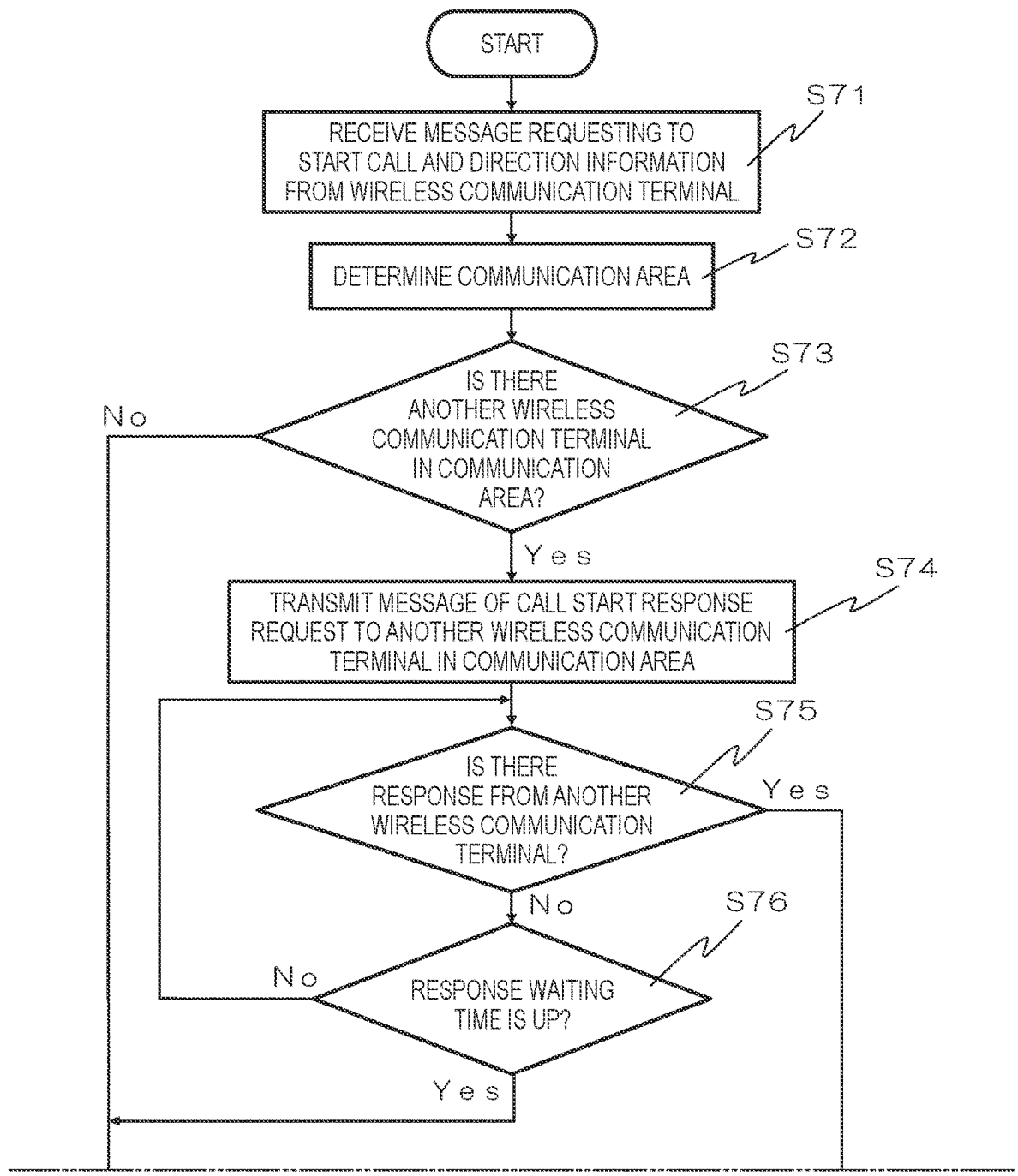
FIG. 7 is a flowchart showing a process of the repeater when receiving a message of a call start request according to the first embodiment.

FIG. 7 is a flowchart illustrating the process of the repeater 30 when the message requesting to start a call is received from the wireless communication terminal 20-1.

When the message requesting to start a call and the direction information are received from the wireless communication terminal 20-1 (S71), the communication area is determined based on the map information stored by the repeater 30, a position of the wireless communication terminal 20-1, and the received direction information (S72).

Based on information of positions of all wireless communication terminals in the work area 100, it is determined whether there is a wireless communication terminal other than the wireless communication terminal 20-1 in the determined communication area (S73).

When there is a wireless communication terminal other than the wireless communication terminal 20-1 in the determined communication area (YES in S73), the message of the call start response request is transmitted to the wireless communication terminal in the communication area (S74).

After transmitting the message of the call start response request, the repeater 30 waits for a certain period of time to receive a call start response message from another wireless communication terminal (S75, S76).

When the call start response message is received from the wireless communication terminal 20-2 (YES in S75), the call start message is transmitted to the wireless communication terminals 20-1 and 20-2 (S77), and the call is started between the wireless communication terminals 20-1 and 20-2 (S78).

Figure 8:
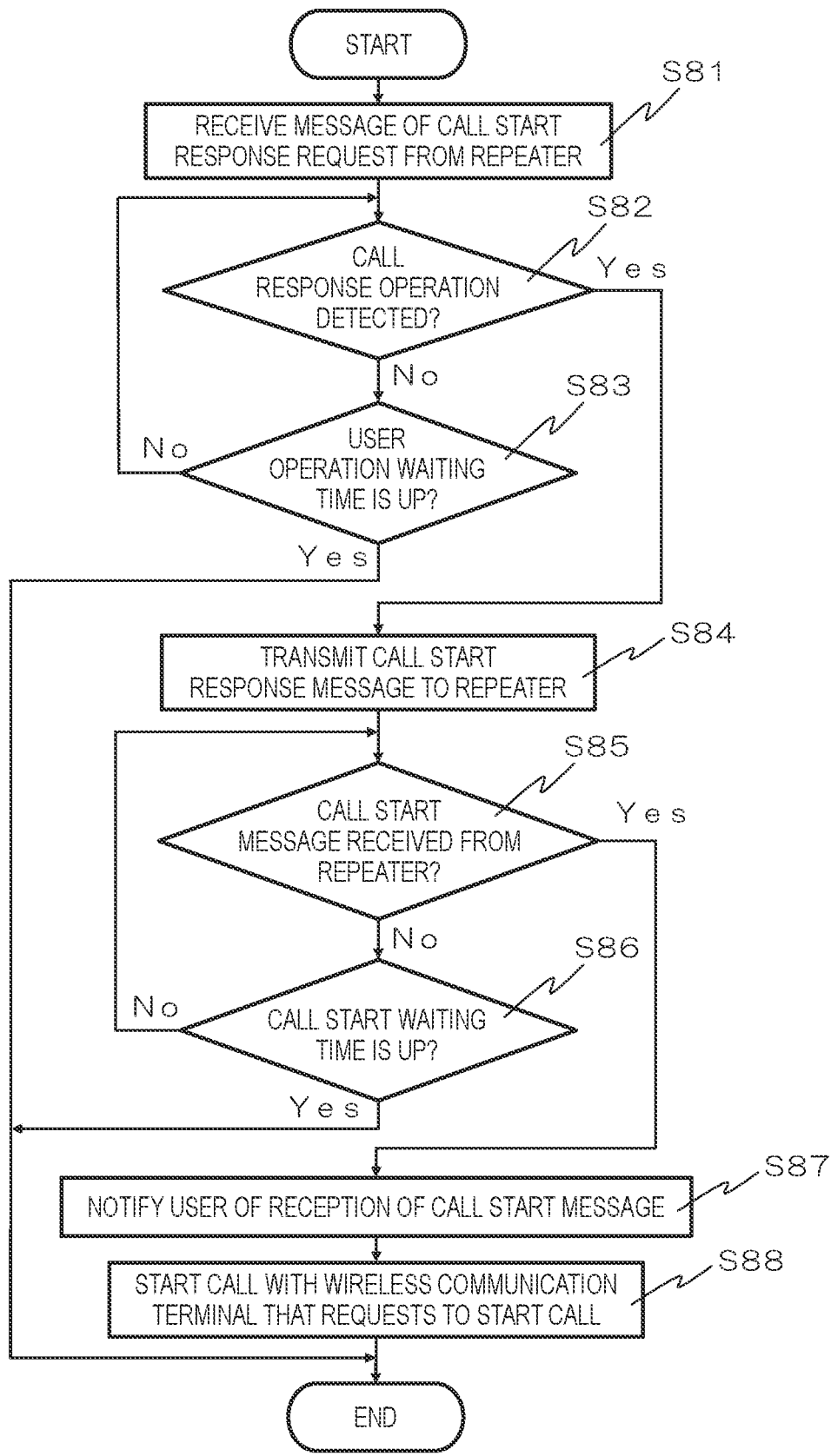
FIG. 8 is a flowchart showing a process of the wireless communication terminal when responding to a call start request according to the first embodiment.

FIG. 8 is a flowchart illustrating the process of the wireless communication terminal 20-2 when the wireless communication terminal 20-2 receives the message of the call start response request.

First, when receiving the message of the call start response request from the repeater (S81), the wireless communication terminal 20-2 waits for a response operation from the user 10-2 for a certain period of time (S82, S83).

When there is a response operation from the user 10-2 (YES in S82), the call start response message is transmitted to the repeater 30 (S84).

After transmitting the call start response message to the repeater 30, the wireless communication terminal 20-2 waits for a certain period of time to receive the call start message from the repeater 30 (S85, S86).

When the call start message is received from the repeater 30 (YES in S85), the user 10-2 is notified of the call start message (S87), and the call with the wireless communication terminal 20-1 is started (S88).

<1-2-3. Detailed Operation of Communication Area Determination>

Hereinafter, an example of detailed operation of the communication area determination will be described with reference to FIGS. 9 and 10 by taking, as an example, a case in which the user 10-1 (wearing the wireless communication terminal 20-1) in the sub area 103 in FIG. 10 transmits a message requesting to start a call while designating the front direction of the airplane (a direction of an arrow in FIG. 10).

Figure 9:
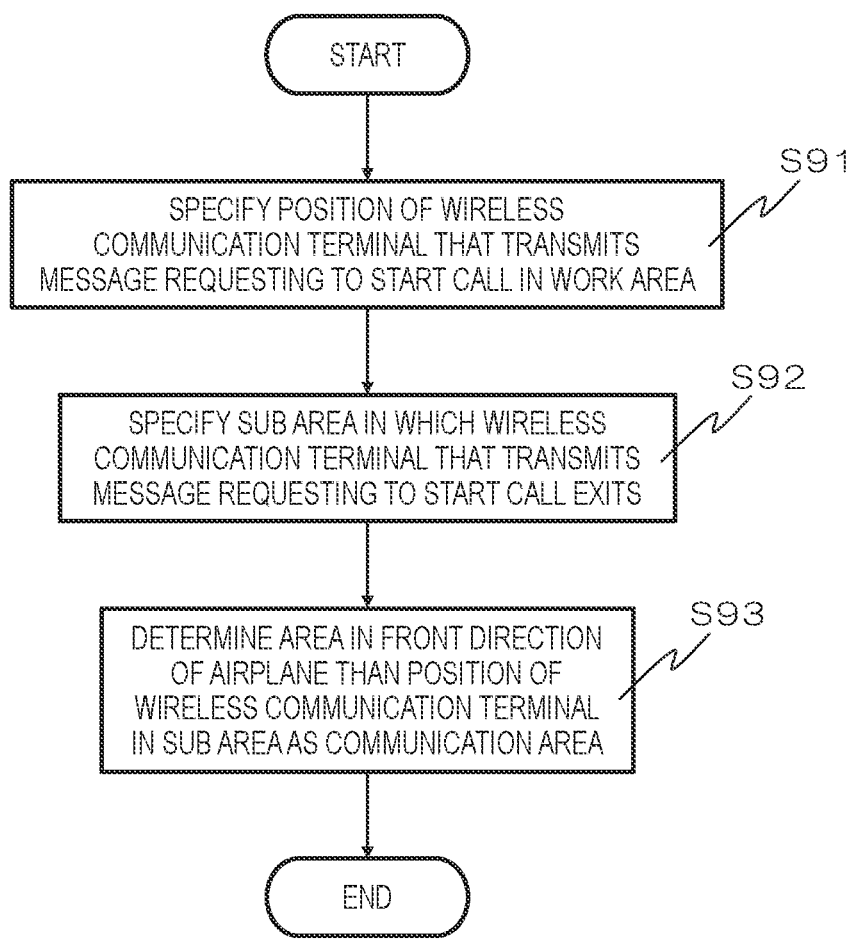
FIG. 9 is a flowchart showing a process of communication area determination according to the first embodiment.
Figure 10:
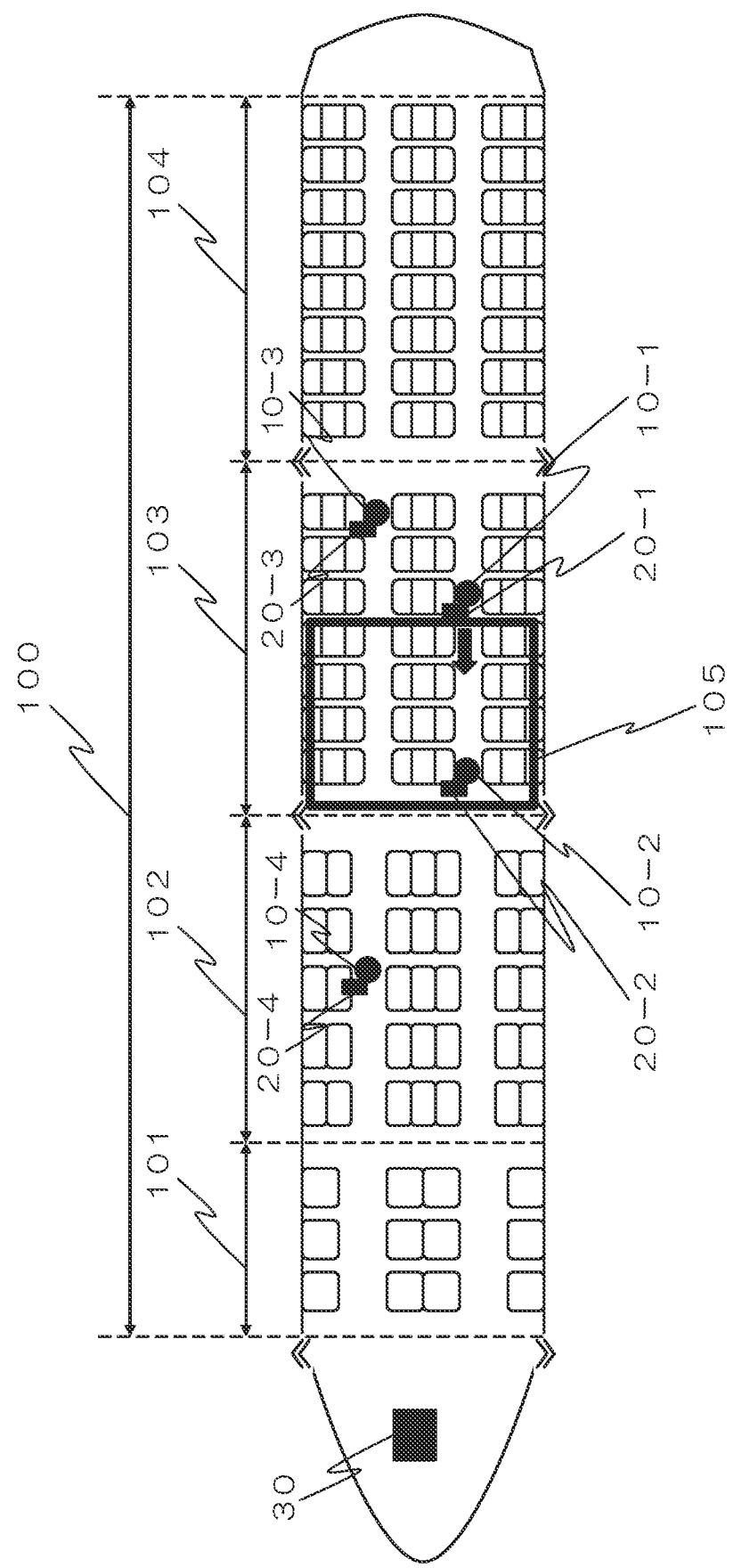
FIG. 10 is a schematic diagram of the interior of an airplane showing an example of the communication area determination according to the first embodiment.

FIG. 9 is a flowchart illustrating a process when the repeater 30 determines a communication area. FIG. 10 is a schematic diagram of the interior of the airplane showing an example of the communication area determination.

When the repeater 30 receives the message requesting to start a call from the wireless communication terminal 20-1, the wireless communication terminal position specifying unit 304 is first used to specify a position of the wireless communication terminal 20-1 in the work area 100 (S91).

Next, the sub area 103 in which the wireless communication terminal 20-1 exists is specified based on the position information (S92).

An area in the front direction of the airplane than the position of the wireless communication terminal 20-1 in the specified sub area 103 is specified, and the area is determined as a communication area 105 (S93).

Note that a case in which the area in the front direction of the airplane than the position of the wireless communication terminal 20-1 in the specified sub area is set as the communication area is taken as an example, and another condition may be added to determine the communication area. For example, an area within a certain distance (for example, within 3 m) from the user 10-1 may be excluded from the communication area. Since a user near the user 10-1 can communicate verbally, other users with whom the user 10-1 wants to communicate using the wireless communication terminal 20-1 are considered to be at a certain distance or more away. Therefore, by excluding the area within a certain distance from the communication area, it is possible to more accurately determine an area in which other users with whom the user wants to communicate exist. As another example, in a case where there are a plurality of passages in an airplane, when the front direction or the rear direction of the airplane is designated, only the vicinity of the same passage in the direction may be used as the communication area. As still another example, a specific time period may be set as a communication area including all or a part of adjacent sub areas in a designated direction. In a case where a service is provided in an airplane or the like, the number of flight attendants stationed in each sub area may vary depending on the time period. In such a case, it is possible to more accurately determine an area in which another user who wants to make a call is present by including adjacent sub areas for the specific time period.

After determining the communication area once, if there is no other wireless communication terminal within the communication area, all or a part of the adjacent sub areas in the designated direction may be determined again as the communication area. Similarly, when determining a communication area, the existence of another wireless communication terminal in the communication area may be checked, and only when there is another wireless communication terminal, the communication area may be determined as the communication area.

1-3. Effects and the Like

As described above, in the first embodiment, the wireless communication system includes the wireless communication terminals 20 and the repeater 30. When receiving the message from the wireless communication terminal 20 worn by the user who wants to communicate with another user and the direction information indicating the existence of a user with whom the user wants to communicate, the repeater device 30 determines the communication area and transmits the message to the wireless communication terminal 20 worn by the user in the communication area.

As a result, the user can intuitively transmit the message.

In addition, in a case of use by a user in an airplane, since different users board each flight, even if names and other information are registered in the wireless communication terminal in advance, the names and faces may not match, and it may not be possible to designate a counterpart to whom the message is to be transmitted. Even in such a case, in the present invention, it is possible to select a counterpart to whom a message is to be transmitted based on a direction indicating the existence of the counterpart to whom a message is to be transmitted.

INDUSTRIAL APPLICABILITY

The present disclosure can be applied to a wireless communication system in which users communicate with each other using wireless communication terminals in a specific area. Specifically, the present disclosure can be applied to a wireless communication system or the like used in an airplane, a factory, or the like.

What is claimed is:

1. A wireless communication system in which a plurality of wireless communication terminals communicate via a repeater in a predetermined area, wherein
    the wireless communication terminal includes
        an acquisition unit configured to acquire an operation of a user,
        a transmission unit configured to transmit a message and direction information based on the operation of the user to the repeater when starting communication with another wireless communication terminal in the predetermined area via the repeater based on the operation of the user, and
        a message reception unit configured to receive a message from the repeater,
    the repeater includes
        a map information storage unit configured to store map information obtained by dividing the predetermined area into a plurality of areas,
        a position specifying unit configured to acquire position information for specifying a position of the plurality of wireless communication terminals in the predetermined area, and
        a control unit configured to transmit a message to the other wireless communication terminal in a communication area when the message and the direction information are received from the wireless communication terminal, and
    the control unit is configured to determine, as the communication area, at least one area among the plurality of areas based on the map information, the position information, and the direction information.

2. The wireless communication system according to claim 1,
    wherein the control unit is configured to determine, as a communication area, an area of a part of the one area based on the position information and the direction information.

3. The wireless communication system according to claim 1,
    wherein the control unit is configured to transmit a message to the other wireless communication terminal in the communication area that exists at a position separated by a predetermined distance or more from a wireless communication terminal that transmits the message.

4. The wireless communication system according to claim 1,
    wherein the control unit is configured to, when the other wireless communication terminal is not present in the communication area, determine an adjacent area adjacent to the communication area based on the direction information, and transmit the message to another wireless communication terminal in the adjacent area.

5. The wireless communication system according to claim 1,
    wherein the control unit is configured to transmit the message to another wireless communication terminal that is moving in the communication area.

6. The wireless communication system according to claim 4,
    wherein the control unit is configured to transmit the message to the other wireless communication terminal in the adjacent area when there is no other wireless communication terminal in the communication area during a predetermined time period.

7. The wireless communication system according to claim 1,
    wherein an operation of the user is performed by detecting a predetermined operation of the user.

8. The wireless communication system according to claim 1,
    wherein the wireless communication terminal includes a sensor for acquiring an operation of a user, and is worn on an arm of the user.

9. The wireless communication system according to claim 1,
    wherein the direction information is information designated by a direction of a hand raised by the user wearing the wireless communication terminal.

10. A repeater that communicates with a plurality of wireless communication terminals in a predetermined area, the repeater comprising:
- a map information storage unit configured to store map information obtained by dividing the predetermined area into a plurality of areas;
- a position specifying unit configured to acquire position information for specifying a position of the plurality of wireless communication terminals in the predetermined area; and
- a control unit configured to transmit a message to another wireless communication terminal that is different from the wireless communication terminal in a communication area when a message and direction information based on an operation of an user are received from the wireless communication terminal,
- wherein the control unit is configured to determine, as the communication area, at least one area among the plurality of areas based on the map information, the position information, and the direction information.

11. A wireless communication method in which a plurality of wireless communication terminals communicate via a repeater within a predetermined area, the wireless communication method comprising:
- acquiring an operation of a user;
- transmitting a message and direction information based on an operation of the user to the repeater when starting communication with another wireless communication terminal in the predetermined area via the repeater based on the operation of the user;
- acquiring position information for specifying a position of the plurality of wireless communication terminals in the predetermined area;
- determining, based on map information obtained by dividing the predetermined area into a plurality of areas, the position information, and the direction information, at least one area among the plurality of areas as a communication area; and
- transmitting a message to the other wireless communication terminal in the communication area.

* * * * *